United States Patent [19]

Kawamura et al.

[11] Patent Number: 4,848,291

[45] Date of Patent: Jul. 18, 1989

[54] HEAT-INSULATING PISTON STRUCTURE

[75] Inventors: Hideo Kawamura, Fujisawa; Hiroshi Matsuoka, Yamato, both of Japan

[73] Assignee: Isuzu Motors Limited, Tokyo, Japan

[21] Appl. No.: 198,693

[22] Filed: May 24, 1988

[30] Foreign Application Priority Data

May 30, 1987 [JP] Japan ................................ 62-133300
Jun. 18, 1987 [JP] Japan ................................ 62-150220

[51] Int. Cl.[4] ................................................ F16J 1/04
[52] U.S. Cl. .......................... 123/193 P; 123/193 CP
[58] Field of Search ....................... 123/193 CP, 193 P

[56] References Cited

U.S. PATENT DOCUMENTS

| | | | |
|---|---|---|---|
| 4,590,901 | 5/1986 | Mizuhara | 123/193 P |
| 4,649,806 | 3/1987 | Hartsock | 123/193 P |
| 4,667,627 | 5/1987 | Matsui et al. | 123/193 P |
| 4,694,813 | 9/1987 | Mielke | 123/193 P |
| 4,709,621 | 12/1987 | Matsui et al. | 123/193 P |
| 4,735,128 | 4/1988 | Mahrus | 123/193 P |
| 4,739,738 | 4/1988 | Sander et al. | 123/193 P |
| 4,774,926 | 10/1988 | Adams | 123/193 P |
| 4,798,770 | 1/1989 | Donomoto et al. | 123/193 P |

FOREIGN PATENT DOCUMENTS

| | | |
|---|---|---|
| 113557 | 7/1984 | Japan . |
| 60-93161 | 5/1985 | Japan . |

*Primary Examiner*—E. Rollins Cross
*Attorney, Agent, or Firm*—Browdy and Neimark

[57] ABSTRACT

The heat-insulating piston structure according to the present invention is formed by fixing a piston head, which consists of a material the coefficient of thermal expansion of which is substantially equal to that of a ceramic material, to a piston skirt, and setting a thin, flat plate portion of a ceramic material on the whole of the flat surface of the piston head which is on the side of a combustion chamber via a heat-insulating member. Accordingly, the piston can be formed so that it has excellent heat-insulating characteristics and high thermal resistance, deformation resistance and corrosion resistance. Especially, the thin plate portion of a ceramic material, which is exposed to a combustion gas, can be formed to the smallest possible thickness to reduce the thermal capacity thereof greatly. Therefore, the temperature of the wall of the combustion chamber varies easily with that of the combustion gas (in other words, the amplitude of the temperature of this wall becomes large). Consequently, a difference between the temperature of the thin plate portion of a ceramic material and those of the gases (combustion gas and suction air) becomes small momentarily, so that the heat transfer rate of the thin plate portion decreases. This causes a decrease in the quantity of heat which the suction air receives from the wall surface. As a result, the suction air smoothly enters the combustion chamber without being expanded therein. This enables the suction efficiency and cycle efficiency to be improved.

23 Claims, 4 Drawing Sheets

F/G. 4 (Prior art)
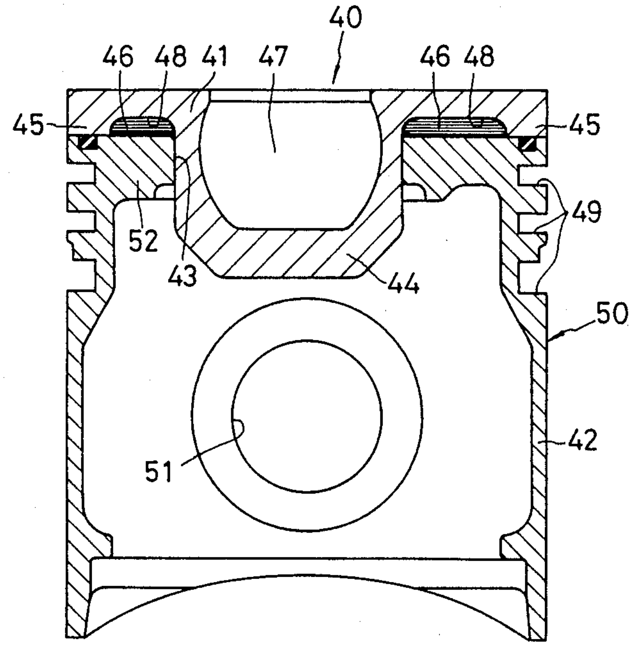

HEAT-INSULATING PISTON STRUCTURE

BACKGROUND OF THE INVENTION

1. Field of the Invention

This invention relates to a heat-insulating piston structure for a heat-insulating engine.

2. Description of the Prior Art

A conventional engine member of a heat-insulating piston in which a ceramic material is utilized as a heat-insulating material and a heat resisting material is disclosed in, for example, Japanese Utility Model Laid-Open No. 113557/1984 and Japanese Patent Laid-Open No. 93161/1985.

First, the construction of the piston disclosed in Japanese Utility Model Laid-Open No. 113557/1984 will be roughly described with reference to FIG. 3. FIG. 3 shows a piston 30. In this piston 30, a ceramic crown portion 31 and a metallic skirt portion 32 are combined together by a bolt 36 so that a closed space 33 is formed between the lower surface of the ceramic crown portion 31, which has a combustion chamber 39 in the upper surface thereof and a groove 37 for a piston ring in the outer circumferential surface thereof, and the upper surface of the metallic skirt portion 32, which has grooves 38 for further piston rings in the outer circumferential surface thereof, and a seal member 35 is provided so that it can be engaged with an end portion of a piston pin inserting bore 34 opened in the outer circumferential surface of the metallic skirt portion 32. In this piston structure, the crown portion consisting of a ceramic material has an extremely large thickness, and, therefore, its required thermal capacity becomes very large. Since the combustion chamber 39 is formed in the crown portion 31, it is necessary that the crown portion 31 be formed to a large thickness to maintain the construction 1 characteristics and a suitable strength thereof.

The construction of the heat-insulating piston disclosed in Japanese Patent Laid-Open No. 93161/1985 will now be roughly described with reference to FIG. 4. FIG. 4 shows a heat-insulating piston designated generally by a reference numeral 40. In this heat-insulating piston 40, a crown fitting bore 43 is provided in an upper end wall 52 of a piston body 50 which includes a piston skirt portion 42 having piston ring fitting grooves 49 and a piston pin fitting bore 51, and a projection 44 formed on a crown 41 is inserted in the bore 43, the portion of the piston body 50 which is around the bore 43 being thermally pressed to combine the piston body 50 and crown 41 with each other. The piston body 50 is formed out of aluminum or malleable cast iron, and the crown 41 out of a ceramic material, such as silicon nitride. The projection 44 of the crown 41 is provided with a combustion chamber 47 formed in the interior thereof, and a smaller projection 45 is formed on the outer circumferential portion of the crown 41. A heat-insulating material 46 consisting of ceramic fiber or a stainless steel mesh arranged in a hollow 48 formed between the projections 44, 45 is fixed in a sandwiched state between the relative portions of the crown 41 and the upper end wall 52 of the piston body 50. The heat-insulating characteristics of this heat insulating material 46 displayed with respect to the combustion chamber 47 are not satisfactory. Moreover, the thickness of the crown 41 consisting of a ceramic material is very large similarly to that of the crown portion 31 of the previously-described piston 30, and the crown 41 is formed in such a manner that the crown 41 is exposed directly to the heat in the combustion chamber 47. This causes the required thermal capacity of the piston to increase.

It is very difficult to furnish a heat-insulating piston member, which utilizes the above-mentioned ceramic material as a heat-insulating material or a heat resisting material, with satisfactory heat-insulating characteristics. Since the ceramic material is exposed to the high-temperature heat in the combustion chamber, it receives a thermal shock. Therefore, it is necessary that the member consisting of a ceramic material be formed to a preferable strength. If the thickness of the ceramic material constituting the wall of the crown is increased for the heat-insulating purpose, the thermal capacity of the wall becomes large. Accordingly, in a suction stroke, the suction air receives a large quantity of heat from the combustion chamber to cause the temperature of the suction air to increase, so that this heat adversely affects the air suction operation. As a result, the suction efficiency decreases, and the air suction operation stops. Moreover, it is necessary that the heat-insulating characteristics of the member of a ceramic material with respect to the heat occurring in an expansion stroke be improved.

SUMMARY OF THE INVENTION

A primary object of the present invention is to provide a heat-insulating piston structure capable of solving the above-mentioned problems, having excellent heat-insulating characteristics and an extremely high thermal resistance, capable of setting to the lowest possible level the thermal capacity of the surface member of the piston head which faces the combustion chamber the temperature in which becomes high due to the combustion gas to which the combustion chamber is exposed, and capable of improving the suction efficiency and cycle efficiency. To be exact, the thin plate portion of a ceramic material, which is exposed to the combustion gas, of the piston reciprocatingly moving in the cylinder liner is formed to the smallest possible thickness to reduce the thermal capacity of the same portion. Consequently, the temperature of the wall of the combustion chamber comes to vary easily in accordance with that of the combustion gas. In other words, when the thickness of the wall of the combustion chamber is small, the difference between the temperature of the wall detected when the temperature in the combustion chamber is high and that of the same wall detected when the temperature in the combustion chamber is low becomes larger than such a difference in the case where the thickness of the wall of the combustion chamber is large. As a result, the difference between the temperature of the thin plate portion of a ceramic material and that of the combustion gas becomes small momentarily, and the heat transfer rate decreases. This causes a decrease in the quantity of heat which the suction air receives from the surface of the wall of the combustion chamber, whereby the suction air enters the combustion chamber smoothly without being expanded therein. This enables the suction efficiency and cycle efficiency to be improved.

Another object of the present invention is to provide a heat-insulating piston structure having a piston head consisting of a material the coefficient of thermal coefficient of which is substantially equal to that of a ceramic material and fixed to the piston skirt, and a thin plate portion consisting of a ceramic material, such as silicon nitride and silicon and fixed to the upper horizontal surface of the piston head via a heat-insulating material, these thin plate portion, piston head and piston skirt being fixed very firmly and stably, the piston structure being constructed so that the thin plate portion receives in a preferable condition the pressure applied thereto during an explosion stroke without giving rise to a problem of strength of the thin plate portion even when it receives a thermal shock, and in such a manner that the piston has excellent heat-insulating characteristics and high thermal resistance, corrosion resistance and deformation resistance.

A further object of the present invention is to provide a heat-insulating piston structure, wherein the coefficients of thermal expansion of the thin plate portion of a ceramic material and the piston head of cermet are substantially equal, the piston head and piston skirt being combined with each other without any troubles owing to the high rigidity of the piston head, the piston head and piston skirt being in a stably combined state and not easily deformed even when a high pressure is applied thereto, the gas sealing effect of a boundary portion between the piston head and piston skirt being kept stable to improve the sealing capability of the piston structure.

A further object of the present invention is to provide a heat-insulating piston structure provided with a heat-insulating member of a ceramic material between the thin plate portion of a ceramic material and the piston head, and a heat-insulating layer of air between the piston head and piston skirt, the heat-insulating member consisting, for example, of whiskers of potassium titanate, zirconia fiber, or a mixture of these materials and glass fiber, so that it displays excellent heat-insulating performance with respect to the combustion chamber, whereby the thermal energy can be confined in the combustion chamber with no thermal energy escaping therefrom through each piston member.

BRIEF DESCRIPTION OF THE DRAWINGS

FIG. 4 is a sectional view of an example of a conventional heat-insulating piston.

DESCRIPTION OF THE PREFERRED EMBODIMENTS

The embodiments of the heat-insulating piston structure according to the present invention will hereinafter be detailed with reference to drawings.

Figure 1:
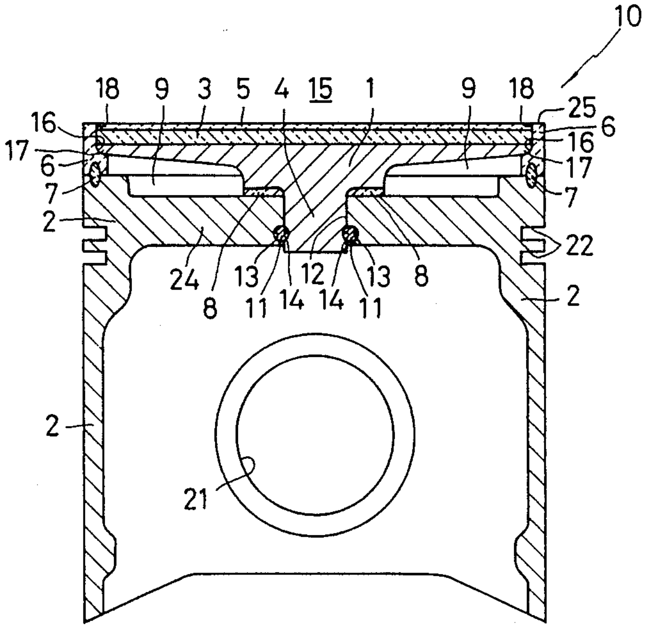
FIG. 1 is a sectional view of an embodiment of the heat-insulating piston structure according to the present invention.

FIG. 1 shows an embodiment of the heat-insulating piston structure according to the present invention which is designated generally by a reference numeral 10. This heat-insulating piston 10 is adapted to be moved reciprocatingly in a cylinder liner, and consists mainly of a piston head 1, a metallic piston skirt 2, a heat-insulating material 3, a thin plate portion 5 composed of a ceramic material, and a ring 6. The piston head 1 has at its central portion a boss 4 constituting a mounting portion to which the piston skirt 2 is fixed, and it consists of a material having a coefficient of thermal expansion substantially equal to that of a ceramic material, a high strength and a comparatively high Young's modulus, for example, cermet and a metal. The piston head 1 is not provided with a combustion chamber, and the surface, which is on the side of the combustion chamber 15, of the piston head 1 is formed flat. The piston skirt 2 is provided at its central portion with a mounting hole 12 in which the mounting boss 4 of the piston head 1 is fitted. The piston head 1 is set fixedly in a forcibly pushed state in the piston skirt 2 by fitting the mounting boss 4 of the piston head 1 in the central hole 12 in the piston skirt 2, and inserting a metal ring 11 in a deformed state in both an annular groove 14 in the outer circumferential surface of the boss 4 and an annular groove 13 in the inner circumferential surface of the central mounting hole 12. A buffer member 8 consisting of a heat-insulating gasket is inserted in a pressed state between the portion of the piston head 1 which is in the vicinity of the mounting boss 4 and the portion of the piston skirt 2 which is in the vicinity of the central mounting hole 12, this buffer member 8 having the heat-insulating function as well. A space defined by the lower surface of the piston head 1, the upper surface of an upper end wall 24 of the piston skirt 2 and a part of the inner circumferential surface of the ring 6 functions as a layer 9 of heat-insulating air.

The heat-insulating piston structure according to the present invention has characteristics, especially, concerning the following arrangement of parts. The thin plate portion 5 of a ceramic material which is formed to an extremely small thickness so as to reduce the thermal capacity of the surface, which is on the side of the combustion chamber 15, of the heat-insulating piston 10, i.e. the surface exposed to the combustion gas of the piston 10, is provided on the piston head 1 via the heat-insulating member 3 so that the thin plate portion 5 faces the combustion chamber 15. This thin plate portion 5 is formed out of a ceramic material, such as silicon nitride to a thickness of around or not more than 1 mm. The ceramic ring 6, the material of which is the same as that of the thin plate portion 5, is fitted around the outer circumferential portion of the thin plate portion 5, and the thin plate portion 5 and ring 6 are joined to each other at, for example, a contact portion designated by a reference numeral 18 by chemical vapor deposition. A stepped portion 16 is formed at the intermediate section of the inner circumferential surface of the ring 6. The outer circumferential portion 17 of the piston head 1 is fitted in the ring 6 so as t contact the stopped portion 16 of the ring 6. The heat-insulating member 3 is sealed in a space defined by the lower surface of the thin plate portion 5, a part of the inner circumferential surface of the ring 6 and the upper surface of the piston head 1. This heat-insulating member 3 consists of whiskers of potassium titanate or zirconia fiber functions not only as a heat-insulating member but also as a structural member for receiving a pressure applied to the thin plate portion 5 during an explosion stroke. Since the piston head 1 is set in a pushed state in the piston skirt 2, the outer circumferential portion 17 of the piston head 1 is pressed against the stepped portion 16 of the ring 6, and the ring 6 against the circumferential portion of the upper end wall 24 of the piston skirt 2. The thickness of the upper end portion, which constitutes a portion 25 exposed to the combustion gas, of the ring 6 is preferably set to the lowest possible level. In this embodiment, a gasket consisting of a carbon seal 7 for sealing the piston structure is inserted between the lower end portion of the ring 6 and the upper end portion of the piston skirt 2. An axial sealing force is applied to the carbon seal 7 by setting the piston head 1 in a pushed state on the piston skirt 2. In this heat-insulating piston structure, it is necessary that a compressive force occurring due to the explosion of the gaseous mixture be received uniformly by the heat-insulating member 3 serving as a heat resisting material of a high porosity consisting of whiskers of potassium titanate or zirconia fiber. The surface of the piston head 1 which is on the side of the combustion chamber, i.e., on the side of the thin plate portion, and both surfaces of the thin plate portion 5 are preferably formed flat. Referring to the drawing, reference numeral 21 denotes a bore in which a piston pin is to be fitted, and 22 grooves in which piston rings are to be inserted.

Figure 2:
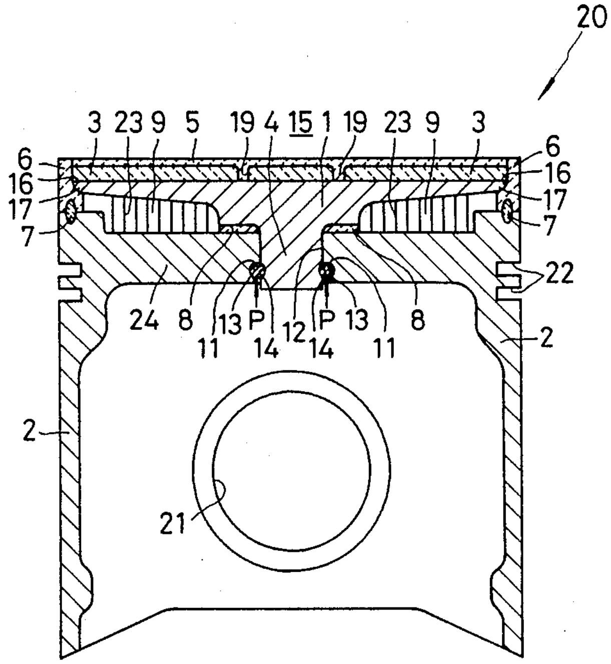
FIG. 2 is a sectional view of another embodiment of the heat-insulating piston structure according to the present invention.
Figure 3:
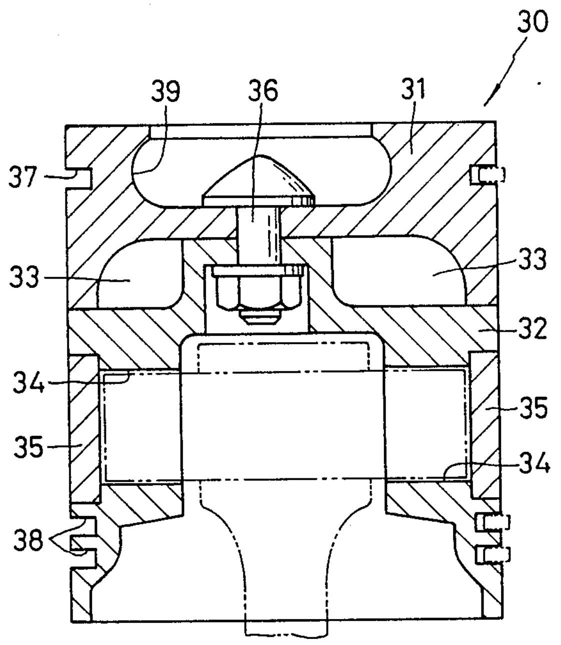
FIG. 3 (Prior art)
FIG. 3 is a sectional view of an example of a conventional piston.

Another embodiment of the heat-insulating piston structure according to the present invention will now be described with reference to FIG. 2. The construction and operation of the parts, which are other than a thin plate portion and a layer of heat-insulating air, of this embodiment are the same as those of the corresponding parts of the heat-insulating piston structure described previously with reference to FIG. 1. Accordingly, the parts of the embodiment of FIG. 2 which have the same construction and functions as those of the embodiment of FIG. 1 are designated by the same reference numerals used in FIG. 1, and the descriptions of these parts are omitted. The thin plate portion 5 of a heat-insulating piston 20 is provided on its lower surface with claws 19 constituting supports engageable with the upper surface of a piston head 1. In order to insert a metallic ring 11 in a deformed state in both an annular groove 14 in the piston head 1 and an annular groove 13 in a piston skirt 2, i.e., fix this metallic ring 11 in these grooves 14, 13 by utilizing the metal flow thereof, after a mounting boss 4 of the piston head 1 has been fitted in a central mounting hole 12 in the piston skirt 2, the metallic ring 11 is press-fitted in a deformed state in the grooves 14, 13 in the direction of arrows P in the drawing by using press. During this press-fitting operation, extremely large stress occurs in the thin plate portion 5 and piston head 1 due to the pressing force of the press. Since this deformation load receives at the claws 19, the destruction of the thin plate portion 5 can be prevented. A metallic honeycomb 23 constituting a support member is inserted in a space serving as a layer of heat-insulating air and defined by the lower surface of the piston head 1, the upper surface of an upper end wall 24 of the piston skirt 2 and a part of the inner circumferential surface of a ring 6. This metallic honeycomb 23 consists of a metallic material, such as stainless steel or aluminum. The compressive force occurring in an explosion stroke of the engine is received by a buffer member 8 provided between the piston head 1 and piston skirt 2, and a stepped portion 16 formed on the inner circumferential surface of the ring 6. Since the metallic honeycomb 23 is provided in the layer 9 of heat-insulating air, a part of this compressive force is received thereby. Therefore, this embodiment can be formed very preferably with respect to the strength thereof.

What is claimed is:

1. A heat-insulating piston structure comprising:

a piston skirt adapted to be moved reciprocatingly in a cylinder liner and having an upper end wall;

a piston head having a mounting portion to be fixed to said upper wall of said piston skirt and formed out of a material the coefficient of thermal expansion of which is substantially equal to that of a ceramic material;

a ring consisting of a ceramic material and adapted to be fixed in a pressed state to the upper surface of said piston skirt by setting said piston head on said piston skirt;

a thin plate portion of a small thickness consisting of a ceramic material, joined at its outer circumferential portion to said ring and constituting a surface member exposed to a combustion gas; and a heat-insulating member sealed in a hollow space defined by the upper surface of said piston head, the lower surface of said thin plate portion and a part of the inner circumferential surface of said ring.

2. A heat-insulating piston structure according to claim 1, wherein the outer circumferential section of said thin plate portion and the upper end portion of said ring are joined to each other by the chemical vapor deposition of a ceramic material.

3. A heat-insulating piston structure according to claim 1, wherein said thin plate portion is formed to the smallest possible thickness so as to minimize the thermal capacity thereof.

4. A heat-insulating piston structure according to claim 1, wherein the thickness of said thin plate portion is about or not more than 1 mm.

5. A heat-insulating piston structure according to claim 1, wherein the thickness of said ring joined to said thin plate portion is set to the lowest possible level so as to minimize the thermal capacity of said ring exposed to the combustion gas.

6. A heat-insulating piston structure according to claim 1, wherein the upper surface which is exposed to the combustion gas of said thin plate portion is formed flat.

7. A heat-insulating piston structure according to claim 1, wherein said thin plate portion is provided on its lower surface with supports engageable with the upper surface of said piston head.

8. A heat-insulating piston structure according to claim 1, wherein the upper surface of said piston head is flat.

9. A heat-insulating piston structure according to claim 1, wherein said heat-insulating member functions as a structural member for receiving a pressure applied to said thin plate portion.

10. A heat-insulating piston structure according to claim 1, wherein said thin plate portion and said ring are formed out of silicon nitride.

11. A heat-insulating piston structure according to claim 1, wherein said thin plate portion and said ring are formed out of silicon carbide.

12. A heat-insulating piston structure according to claim 1, wherein said ring is provided on its inner circumferential surface with a stepped portion in which the outer circumferential portion of said piston head is fitted, the lower end portion of said ring being engaged in a pressed state with the upper end surface of said piston skirt by firmly setting said piston head on said piston skirt.

13. A heat-insulating piston structure according to claim 12, wherein a gasket consisting of a carbon seal is inserted between the surfaces, which contact each other, of said lower end portion of said ring and said upper end portion of said piston skirt.

14. A heat-insulating piston structure according to claim 1, wherein said mounting portion of said piston head is a mounting boss formed at the central section of said piston head, said mounting boss being fitted in said central mounting hole in said piston skirt to thereby combine said piston head with said piston skirt.

15. A heat-insulating piston structure according to claim 14, wherein said piston head and said piston skirt are joined to each other by a metallic ring inserted in a deformed state in both an annular groove formed in the outer circumferential surface of said mounting boss and an annular groove formed in the inner circumferential surface of said central mounting hole.

16. A heat-insulating piston structure according to claim 14, wherein the portion of said piston head which is in the vicinity of said mounting boss and the portion of said piston skirt which is in the vicinity of said central mounting hole are engaged with each other in a pressed state via a buffer member having heat-insulating function.

17. A heat-insulating piston structure according to claim 1, wherein a layer of heat-insulating air is formed in a space defined by the lower surface of said piston head, the upper surface of said upper end wall of said piston skirt and a part of the inner circumferential surface of said ring.

18. A heat-insulating piston structure according to claim 17, wherein a metallic honeycomb is provided in said layer of heat-insulating air so as to receive a compressive force, which is applied to said piston head, by said upper end wall.

19. A heat-insulating piston structure according to claim 1, wherein said material constituting said piston head and having a coefficient of thermal expansion substantially equal to that of a ceramic material is cermet.

20. A heat-insulating piston structure according to claim 1, wherein said material constituting said piston head and having a coefficient of thermal expansion substantially equal to that of a ceramic material is a metallic material having a high strength and a high Young's modulus.

21. A heat-insulating piston structure according to claim 1, wherein said heat-insulating member consists of a heat resisting material having a high porosity and composed of whiskers of potassium titanate.

22. A heat-insulating piston structure according to claim 1, wherein said heat-insulating member consists of a heat resisting material having a high porosity and composed of zirconia fiber.

23. A heat-insulating piston structure according to claim 1, wherein said piston skirt is provided with piston ring inserting grooves in the outer circumferential surface thereof, and a piston pin-fitting bore extending in the diametrical direction thereof.

* * * * *